(12) United States Patent
Schubring et al.

(10) Patent No.: US 11,897,242 B2
(45) Date of Patent: Feb. 13, 2024

(54) EMBOSSER-LAMINATOR WITH ELECTROSTATIC ADHESIVE APPLICATION

(71) Applicant: Paper Converting Machine Company, Green Bay, WI (US)

(72) Inventors: Cory L. Schubring, De Pere, WI (US); Joseph A. Blume, Green Bay, WI (US)

(73) Assignee: Paper Converting Machine Company, Green Bay, WI (US)

( * ) Notice: Subject to any disclaimer, the term of this patent is extended or adjusted under 35 U.S.C. 154(b) by 0 days.

(21) Appl. No.: 18/093,684

(22) Filed: Jan. 5, 2023

(65) Prior Publication Data

US 2023/0226809 A1 Jul. 20, 2023

Related U.S. Application Data

(60) Provisional application No. 63/300,681, filed on Jan. 19, 2022.

(51) Int. Cl.
*B32B 37/10* (2006.01)
*B31F 1/07* (2006.01)
*B32B 38/06* (2006.01)
*B32B 37/12* (2006.01)

(52) U.S. Cl.
CPC ........... *B32B 37/10* (2013.01); *B31F 1/07* (2013.01); *B32B 37/1284* (2013.01); *B32B 38/06* (2013.01); *B31F 2201/0717* (2013.01); *B31F 2201/0787* (2013.01); *B32B 2037/1063* (2013.01)

(58) Field of Classification Search
None
See application file for complete search history.

(56) References Cited

U.S. PATENT DOCUMENTS

| | | | |
|---|---|---|---|
| 3,434,901 A | 3/1969 | Griffiths et al. | |
| 3,556,907 A | 1/1971 | Nystrand | |
| 7,584,698 B2 | 9/2009 | Biagioni et al. | |
| 7,629,043 B2 | 12/2009 | Lindsay et al. | |
| 7,793,869 B2 | 9/2010 | Mather et al. | |
| 7,837,136 B2 | 11/2010 | Yamada et al. | |
| 8,864,061 B2 | 10/2014 | Wojcik et al. | |
| 10,464,084 B2 | 11/2019 | Nolte et al. | |
| 11,174,596 B2 | 11/2021 | Stoeffler | |
| 2008/0227350 A1 | 9/2008 | Schroer et al. | |
| 2019/0232529 A1 | 8/2019 | Torres Martinez | |

FOREIGN PATENT DOCUMENTS

| | | |
|---|---|---|
| EP | 3339226 B1 | 4/2021 |
| EP | 3860842 A1 | 8/2021 |

*Primary Examiner* — Barbara J Musser
(74) *Attorney, Agent, or Firm* — Thompson Coburn LLP

(57) ABSTRACT

A method for producing a laminated embossed web includes the steps of: (a) providing a first web and at least a further web, (b) embossing the first web with a first pattern of embossments, each embossment comprising a top and a side, (c) providing an adhesive with an electrostatic charge, (d) directing the adhesive to the tops of the embossments, and (e) combining the webs.

16 Claims, 3 Drawing Sheets

EMBOSSER-LAMINATOR WITH ELECTROSTATIC ADHESIVE APPLICATION

RELATED APPLICATION DATA

This application claims priority benefit of U.S. provisional application Ser. No. 63/300,681, filed Jan. 19, 2022, the disclosure of which is incorporated by reference herein.

BACKGROUND

In the production of cellulose ply products, such as toilet rolls, kitchen towel rolls, paper handkerchiefs, napkins, and similar items, it is frequent to process a ply of web material by means of embossing: passing the ply through an embossing nip station formed by a pair of steel engraved rolls or by a pair comprised of a steel engraved roller and a pressure roller covered with an elastic material such as rubber. The steel roller has protuberances that deform the elastic cover of the pressure roller. The pressure exerted between the embossing roller and the pressure roller causes permanent deformation of the cellulose material ply which passes through the embossing nip formed between the embossing roller and the pressure roller, forming embossments in the ply. Two or more plies of web, at least one, some or all of which are embossed, are then brought together to form a multi-ply web material. The web material may be wound to form rolls, or it can be cut and folded to form handkerchiefs, napkins, or similar. Each ply may in turn consist of one or more layers of cellulose material.

The embossing pattern is for decorative and functional purposes. From a functional point of view, embossing serves to create limited areas to which adhesive is applied to bond multiple plies that form the web material to one another. Embossing is also used to increase the overall thickness of the web material, increase its softness and absorption capabilities, and for other functions known in the field.

An embossing-laminating device is generally defined as a device that performs an embossing process on at least one ply and bonds two or more plies together by lamination, possibly using adhesive applied to at least one of said plies, preferably on the protruding surfaces of at least some of the embossing protuberances formed on one or more plies.

U.S. Pat. No. 3,556,907 discloses an embossing-laminating device which is in many ways still representative of the current state of the art. U.S. Pat. No. 7,584,698 discloses an embossing-laminating device representative of the current state of the art, with an improvement over the device shown in U.S. Pat. No. 3,556,907 being the open adhesive fountain and the transfer rollers being replaced by an adhesive distributing assembly comprising an enclosed adhesive chamber, a gravure roller, and an applicator roller. Not illustrated in U.S. Pat. No. 7,584,698 are the adhesive supply system known in the art comprising one or more tanks, pumps, piping, and filtration which keeps the enclosed adhesive chamber supplied with adhesive and recirculates adhesive through the system to remove fibers and prevent fibers settling and collecting within the system. The adhesive distributing assembly and adhesive supply system are costly to produce, require precise set-up, require periodic cleaning which necessitates downtime, and must often be moved out of the way to access other areas of the embossing-laminating device for cleaning or clearing jams. The drawbacks of the prior are addressed in the description that follows below.

DETAILED DESCRIPTION

Figure 1:
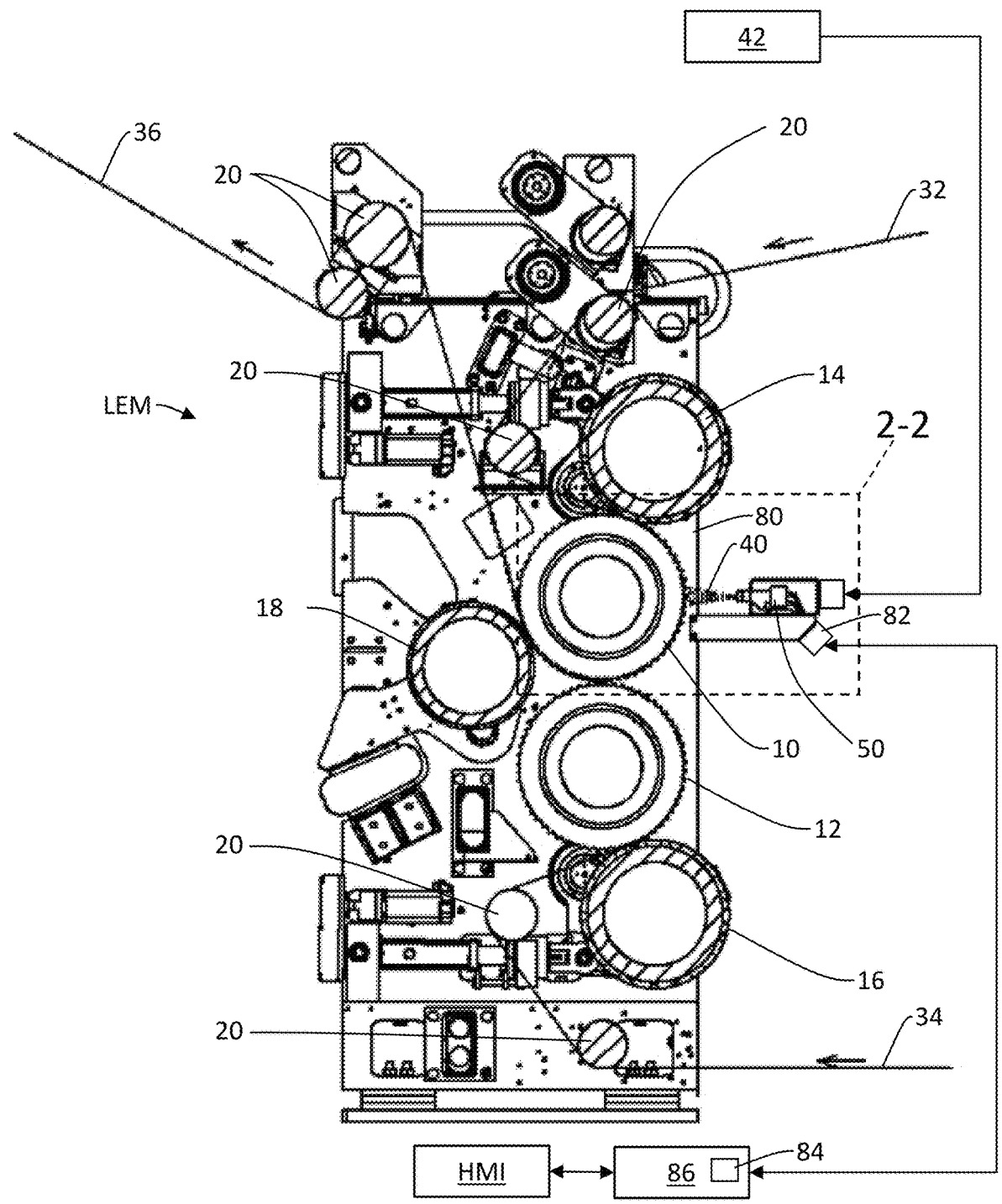
FIG. 1 an elevation view of one embodiment of an embosser-laminating device with electrostatic adhesive application.

The embossing-laminating device may comprise one or more embossing stations comprising a steel engraved roller 10,12 and a pressure roller 14,16; a marrying roller 18; and web handling elements 20 (spreading roller(s), guide roller(s), air foil(s), etc.) known in the art. One or more webs 32,34 (plies) of cellulose product may be embossed in each embossing station, resulting in embossments in the web of a generally truncated cone shape comprising a top and a side. Adhesive may be applied to the tops of the embossments prior to combining the webs. Adhesive may be applied to the web(s) directed through the top embossing station; alternatively, adhesive may be applied to the web(s) directed through the bottom embossing station. As shown in the drawings, adhesive 40 is applied to the web 32 passing through the top embossing station. Pressure may be applied to the combined web 36, for example, with the marrying roller 18.

Electrostatic spray guns 50 may be provided to direct adhesive 40 to a web 32,34 after embossing and before the web is combined with a further web. The adhesive may be a typical tissue lamination adhesive. The adhesive may be a pressure-sensitive adhesive. The adhesive may be water or water-based. The adhesive 40 may be a fluid or a powder. In one example, an embossing-laminating device intended for webs around 2.8 m (110 inches) wide may be provided with an array of around 10 spray guns 50 spaced across the width of the web adjacent to the desired embossing station. More or fewer spray guns may be provided depending on the width of their spray pattern. More spray guns may be provided for wider webs, and fewer for narrower web. The spray guns may be spaced at equal intervals along the width of the web. The adhesive 40 may be provided with a positive electrostatic charge. The adhesive 40 may be provided with a positive electrostatic charge in a storage system 42 located remotely to the embossing station and electrostatic spray gun, reducing the risk of high voltage on the spray guns that could produce an arc. The Trilogy model of spray gun offered by Nordson Corporation, 28601 Clemens Road, Westlake, OH 44145, may be a suitable spray gun. The storage system 42 may comprise a grounded adhesive tank, a low pressure pump such as a diaphragm pump, an electrostatic power supply, a voltage block, and various hoses, filters, regulators, and valves. The pump may deliver adhesive from the tank through the voltage block to the spray guns 50. The electrostatic power supply may provide voltage to the voltage block. The voltage block may electrically charge the adhesive as well as isolate the spray guns 50 and the adhesive hoses from the grounded adhesive tank. The storage system 42 may further comprise temperature control, for example a heating device, to control the temperature of the adhesive. The storage system 42 may also be configured to allow the adhesive 40 to be encapsulated in a pressure-activated carrier material, for instance, a propellant, before or after being provided with a positive electrostatic charge. Encapsulating the adhesive 40 in a pressure-activated carrier material may reduce undesirable results of any spray landing on the web between the embossments, for example, undesired stiffness in the combined web resulting from adhesive being applied to areas other than the tops of the embossments, as only the adhesive subjected to the pressure of the marrying roller would be activated. Encapsulating the adhesive in a pressure-activated carrier may be beneficial for cleanup of the machine, as adhesive which has not been activated by pressure may be easier to clean. Encapsulating the adhesive in a pressure-activated carrier may be beneficial for applications with adhesives which cannot be provided with an electrostatic charge: in such applications, the electrostatic charge may be provided to the carrier material. Using water as the adhesive may be beneficial to web properties such as softness, and may be beneficial to cleanup of the machine. The steel engraved rollers 10,12 may be grounded. The steel engraved rollers 10,12 may be provided with a negative charge. The steel engraved roller may be otherwise manufactured as is known in the art. The steel engraved roller may be provided with a non-conductive material between the embossing protuberances. In a manner similar to that in which an applicator roller applies adhesive to the tops of the embossments in an adhesive distributing assembly, the positively charged adhesive may be attracted to the tops of the embossments. The volume of adhesive applied may be scaled according to the length of web processed. In other words, the volume of adhesive applied may be adjusted proportional to web speed. In an alternative embodiment, electrostatic spray guns 50 may be provided to direct a lotion or a coating to a web 32,34 before or after embossing and, if the web is combined with a further web, before or after the web is combined with the further web.

The steel engraved roller 10,12 at which the spray guns 50 are directed may have a horizontal center line indicated by reference character 60. Each of the spray guns 50 may also have a nozzle that generates a spray with a direction having center line 62. As best shown in FIGS. 2-5, the location and orientation of the spray guns 50 may be characterized by at least one of (i) the vertical position or elevation 64 of the spray gun 50 relative to the horizontal center line 60 of the steel engraved roller 10,12 (that is, the vertical distance 64 between the horizontal center line 60 of the steel engraved roller 10,12 and the center line 62 of the adhesive spray 40 from the nozzle of the spray gun 50 measured at the distal end of the nozzle of the spray gun), (ii) the relative angle 66 between the horizontal center line 60 of the steel engraved roller 10,12 and the center line 62 of the spray 40 of the nozzle of the spray guns 50, and (iii) the horizontal distance 68 measured along the center line 62 of the nozzle of the spray guns between the distal end of the nozzle of spray guns 50 and the outer surface of the steel engraved roller.

Figure 2:
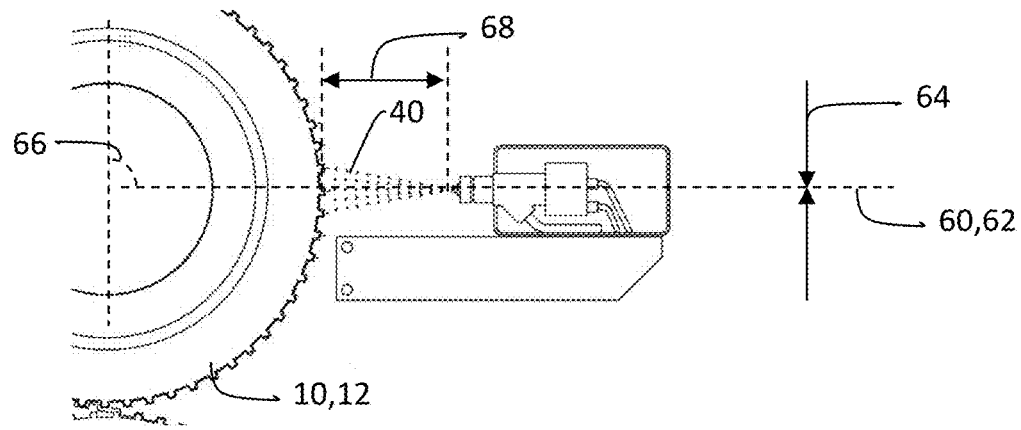
FIG. 2 is a detail view of the electrostatic spray gun of FIG. 1.
Figure 3:
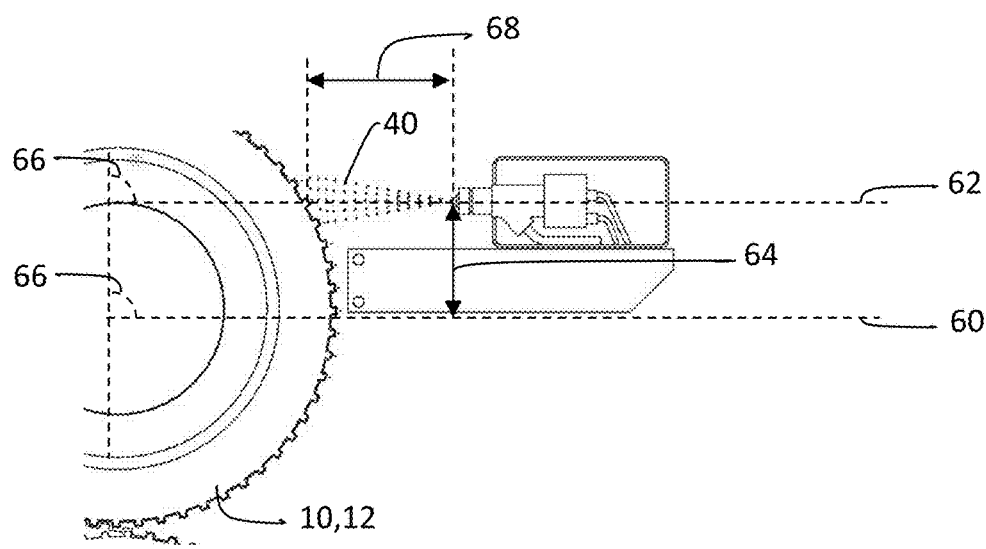
FIG. 3 is a detail view of the electrostatic spray gun of FIG. 1 in an alternative location.
Figure 4:
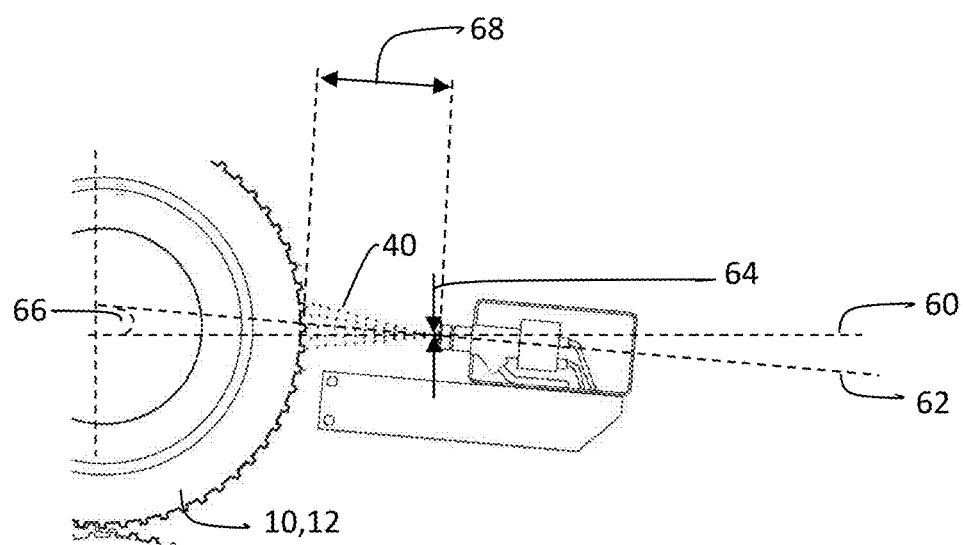
FIG. 4 is a detail view of the electrostatic spray gun of FIG. 1 in an alternative location and an alternative orientation.
Figure 5:
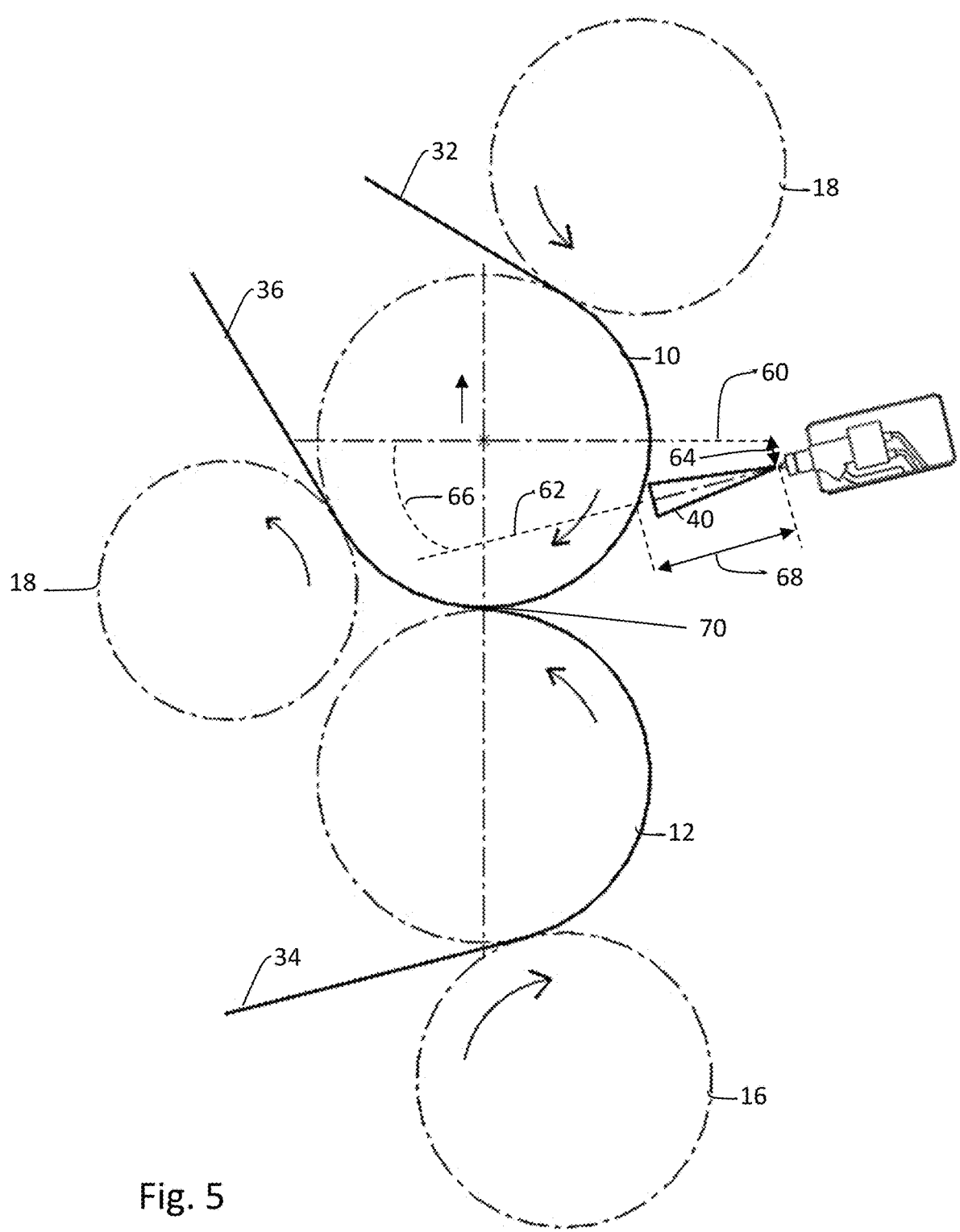
FIG. 5 is a schematic view of the embossing-laminating device of FIG. 1 with the electrostatic spray gun in an alternative location and alternative orientation.

FIGS. 2-5 provide non-limiting illustrations of the manner in which the spray guns 50 may be oriented and/or located relative to the surface of the steel engraved roller 10,12. In FIG. 2, the spray gun is oriented such that the center line 62 of the spray 40 of the spray gun and the center line 60 of the steel engraved roller are co-linear and thus have no elevation 64 and no relative angle 66 therebetween. The distal end of the nozzle of the spray gun and the outer surface of the steel engraved roller are spaced apart along the center line 62 of the spray gun 50 at a distance 68. In FIG. 3, the spray gun is oriented such that the center line 62 of the spray 40 of the spray gun 50 is vertically above the center line 60 of the steel engraved roller at a distance 64, but the center line 62 of the spray 40 of the spray gun 50 is parallel to the center line 60 of the steel engraved roller such there is no relative angle 66 therebetween. The distal end of the nozzle of the spray gun 50 and the outer surface of the steel engraved roller 10,12 are spaced apart along the center line 62 of the spray 40 of the spray gun 50 at a distance 68. In FIG. 4, the spray gun 50 is oriented that the center line 62 of the spray 40 of the spray gun at the distal end of the nozzle of the spray gun and the center line 60 of the steel engraved roller have no elevation 64, but the center line 62 of the spray 40 of the spray gun is upwardly angled relative to the center line 60 of the steel engraved roller such there is a relative upward acute angle 66 therebetween. The distal end of the nozzle of the spray gun and the outer surface of the steel engraved roller are spaced apart along the center line 62 of the spray gun 50 at a distance 68. In the example of FIG. 5, the center line 62 of the spray 40 of the spray gun at the distal end of the nozzle of the spray gun is located vertically below the horizontal centerline of the engraved steel roller 10 of the top embossing station at a distance 64. Also, the center line 62 of the spray 40 of the spray gun is oriented at about a 15 degree downward angle 66 relative to the center line 60 of the steel engraved roller. The distal end of the nozzle of the spray guns 50 is spaced apart from the outer surface of the steel engraved roller along the center line 62 of the spray 40 of the spray gun at a distance 68.

The center line 62 of the spray 40 of the spray guns 50 may be at the same level as, above, or below the horizontal center line 60 of a steel engraved roller 10,12. The spray guns may be oriented to spray horizontally, vertically, at an upward angle, or at a downward angle. Considerations for spray gun location and orientation may include: the relative velocity between the moving web and the adhesive spray; air flows generated by the embossing and laminating process helping or hindering adhesive getting to the tops of the embossments; gravity helping or hindering adhesive getting to the tops of the embossments; where any adhesive that does not get to the tops of the embossments may end up; the arc distance of embossed web over which the adhesive has time to be attracted to the tops of the embossments; and the recommendations of the spray gun manufacturer. It may be advantageous to spray the adhesive with a component of velocity which is in generally the same direction as the web. It may be advantageous to avoid directing the adhesive in a direction opposed by air flows generated by the embossing and laminating process. It may be advantageous to direct adhesive in a direction in which gravity aids in adhesive getting to the tops of the embossments. It may be advantageous to orient the spray guns such that any adhesive that does not get to the tops of the embossments does not collect on machine members or on the floor. Given that the fluid dynamics of the system change with web speed, it may be advantageous to move and/or orient the spray guns with web speed during operation of the system.

The center line 62 of the spray 40 of the spray guns 50 in the example of FIG. 5 are located slightly below the horizontal centerline 60 of the engraved steel roller 10 of the top embossing station at a negative elevation 64, and at about a 15 degree downward angle 66. Not wishing to be bound by any theory, this location and orientation as shown in FIG. 5 may provide the following advantages and disadvantages. The spray 40 is oriented in mostly the same direction as the web 32 is traveling, but with a small component of velocity toward the web, which may provide a good opportunity for adhesive to be attracted to the tops of the embossments. The spray 40 may be less disrupted by the air flow exiting the top or upper embossing station than if the spray guns 50 were located above the horizontal center line of the steel engraved roller 10, and the spray 40 may be helped by air being drawn into the gap or nip 70 between the steel engraved rollers 10,12. Gravity may pull adhesive 40 in an undesirable direction away from the tops of the embossments, but most of the errant adhesive may still end up between the webs which is desirable. Most of the arc of web around the steel engraved roller 10 from about the 3 o'clock position to the point at which the webs 32,34 are combined at about the 6 o'clock position is available for the adhesive 40 to be attracted to the tops of the embossments.

The spray guns 50 may be movably mounted to a machine frame 80, such that they can be moved, either manually or via an actuator 82, to a desired position depending upon the nature of the application and the webs to be processed, conditions experienced during processing, and also for cleaning and maintenance. A control 84 may be provided to automate movement of the spray guns 50 via the actuator 82. The control 84 may be encompassed in a control 86 for the embosser laminating machine LEM and may interface with an HMI of the machine. The control 84 may be programmed to send signals to the actuator 82 to move the spray guns 50 depending upon conditions experienced during processing. The spray guns 50 may be provided with feedback to the control 84,86 to identify when any individual spray gun is malfunctioning. A tray may be provided beneath the array of spray guns to catch any errant adhesive.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A method for producing a laminated embossed web comprising the steps of:
   a. providing a first web and at least a further web,
   b. embossing the first web with a first pattern of embossments, each embossment comprising a top and a side,
   c. providing an adhesive with an electrostatic charge,
   d. directing the adhesive to the tops of the embossments, and
   e. combining the webs.

2. The method of claim 1, further comprising the step of embossing the further web with a further pattern of embossments prior to the step of combining the webs.

3. The method of claim 1, further comprising the step of applying pressure to the combined webs.

4. The method of claim 1, further comprising the step of encapsulating the adhesive in a pressure-activated carrier material prior to the step of directing the adhesive to the tops of the embossments.

5. The method of claim 1 wherein the step of directing the adhesive to the tops of the embossments includes operating at least one spray gun to propel the adhesive to the tops of the embossments.

6. The method of claim 5 wherein the step of propelling the adhesive to the tops of the embossments includes orienting the at least one spray gun such that a center line of spray from the at least one spray gun is acutely angled relative to a horizontal center line of an embossing roller forming the embossments.

7. The method of claim 5 wherein the step of propelling the adhesive to the tops of the embossments includes orienting the at least one spray gun such that the center line of spray from the at least one spray gun is acutely angled in a vertically downward direction relative to the horizontal center line of an embossing roller forming the embossments.

8. The method of claim 7 wherein the step of propelling the adhesive to the tops of the embossments includes orienting the at least one spray gun such that the center line of spray from the at least one spray gun at a distal end of a nozzle of the at least one spray gun is spaced from a horizontal center line of an embossing roller forming the embossments.

9. The method of claim 1 further comprising applying an electrical charge to an embossing roller forming the embossments that is opposite of the electrostatic charge applied to the adhesive.

10. A method comprising:
    providing a machine for embossing and laminating a first web with at least one further web wherein the machine has a roller for embossing the first web with a first pattern of embossments that comprise a top and a side; and
    configuring at least one spray gun to spray adhesive with an electrostatic charge onto the tops of the embossments of the first web prior to combining the first web with the at least one further web.

11. The method of claim 10, further comprising applying the electrostatic charge to the adhesive.

12. The method of claim 11 further comprising configuring the machine to apply an electrical charge to the roller forming the embossments, the electrical charge being opposite the electrostatic charge applied to the adhesive.

13. The method of claim 10, further comprising the step of encapsulating the adhesive in a pressure-activated carrier material.

14. The method of claim 10 wherein the step of configuring the at least one spray gun to spray the adhesive to the tops of the embossments includes enabling a control of the machine to orient the at least one spray gun such that a center line of a spray from the at least one spray gun is acutely angled relative to a horizontal center line of the roller forming the embossments.

15. The method of claim 14 wherein the step of configuring the at least one spray gun to spray the adhesive to the tops of the embossments includes enabling a control of the machine to orient the at least one spray gun such that the center line of the spray from the at least one spray gun is acutely angled in a vertically downward direction relative to the horizontal center line of the roller forming the embossments.

16. The method of claim 15 wherein the step of configuring the at least one spray gun to spray the adhesive to the tops of the embossments includes enabling a control of the machine to orient the at least one spray gun such that the center line of the spray from the at least one spray gun at a distal end of a nozzle of the at least one spray gun is spaced from a horizontal center line of the roller forming the embossments.

* * * * *